United States Patent [19]

Guerin et al.

[11] Patent Number: 4,495,111

[45] Date of Patent: Jan. 22, 1985

[54] HEMIESTERS OF PHOSPHONIC ACIDS

[75] Inventors: Bernard Guerin, Bures/Yvette; Pierre Poisson, Bernay; Georges Sturtz, Brest, all of France

[73] Assignee: Ato Chimie, France

[21] Appl. No.: 535,927

[22] Filed: Sep. 26, 1983

Related U.S. Application Data

[62] Division of Ser. No. 411,046, Aug. 24, 1982, Pat. No. 4,444,930.

[30] Foreign Application Priority Data

Aug. 26, 1981 [FR] France .................................. 81 16332

[51] Int. Cl.³ .............................................. C07F 9/40
[52] U.S. Cl. ...................................... 260/932; 260/961
[58] Field of Search ................................ 260/932, 961

[56] References Cited

U.S. PATENT DOCUMENTS 3,325,569 6/1967 D'Alelio .............................. 260/932

Primary Examiner—Anton H. Sutto
Attorney, Agent, or Firm—Bacon & Thomas

[57] ABSTRACT

The invention relates to a fire-resistant synthetic resin composition containing a polycarbonate, more specifically a bisphenol A derivative, a phosphorous fireproofing additive derived from phosphonic acid, and possibly other additives and/or fillers.

The fireproofing additive is a Li, Na or K hemiester of a phosphonic acid derived from an aromatic or cycloaliphatic hydrocarbon, or from a polynuclear aromatic compound, and is added at the rate of 0.01 to 0.4 weight % in relation to polycarbonate. This small amount of additive improves the fire-resistant properties of the polycarbonate, without affecting its mechanical properties.

7 Claims, No Drawings

HEMIESTERS OF PHOSPHONIC ACIDS

This application is a division of application Ser. No. 411,046, filed Aug. 24, 1982, now U.S. Pat. No. 4,444,930.

DEFINITION OF THE GENERAL FIELD OF THE INVENTION

This invention concerns a fire-resistant synthetic resin composition containing a polycarbonate, a phosphorous fireproofing agent consisting of a phosphonic acid derivative, and possibly other additives and/or fillers.

BACKGROUND OF THE INVENTION

Polycarbonates are themselves self-extinguishing materials. However, for certain purposes, such as building, domestic appliances and the aeronautical industry, a higher level of fire resistance is required. Previous polycarbonate fireproofing agents have included halo compounds, such as decabromodiphenylether, used as additives, or tetrachloro- or tetrabromobisphenol A, used as polycondensation agents. The drawback of such products is that the resulting materials are liable to release poisonous, corrosive hydrohalic acids (hydrochloric or hydrobromic acid) during combustion.

Phosphorus derivatives are commonly used to increase the fire resistance of many polymers. Such products are neither toxic nor corrosive during combustion, and they possess combustion-inhibiting properties, believed to result from the formation of carbon residues and non-combustible materials, which slow down the spread of combustible gas to the combustion zone.

U.S. Pat. No. 4,036,809, for example, suggests the use of xylenephosphonic acid diesters, with halogenated nuclei, as additives to fireproof various polymers, such as polyesters, polystyrene, polyurethanes, polyolefins, and even polycarbonates. The quantity of such diesters added to the polymer depends on the type of polymer, and ranges from a few percent to a few tenths of the total. The need for such large quantities to fireproof the polymer adequately makes their use extremely expensive for industrial purposes. Furthermore, the presence of large quantities of additives can detract from the mechanical properties of the fireproofed polymer, and affect behaviour during their transformation into shaped products.

Alkaline metal salts are also known to be effective fireproofing agents, by acting as radical-recombination catalysts, and thereby as flame inhibitors.

In French patent application No. 79 02836 of Feb. 5, 1979 (publication No. 2 447 940), in the present assignee's name, it was shown that inclusion of phosphonic hemiester groups in the chains of a polycarbonate, produced by reaction between bisphenol A and phosgene, with 0.5 to 2 molar percent bisphenol A replaced by an alkaline hemiester of bis(hydroxy-4 phenyl) alkylphosphonic acid, provided a fire-resistant polycarbonate. However, the inclusion of even such small amounts of phosphonic hemiester compound in the polycarbonate chains, by means of such polycondensation, can disturb the kinetics of the polycondensation reaction, and cause difficulties in use, particularly on an industrial scale, in order to obtain a product with the required properties, for instance as regards molecular weights.

OBJECTS OF THE INVENTION

It has now been found that polycarbonate-based synthetic resin compositions, and more specifically those containing polycarbonate derived from bisphenol A, with at least the same level of fire resistance as copolycarbonates of bisphenol A and alkaline hemiesters of bis(hydroxy-4 phenyl) alkylphosphonic acids, could be obtained by adding to the polycarbonate a very small quantity, usually 0.01 to 0.4 weight%, of non-reactive fireproofing agents, consisting of alkaline hemiesters of phosphonic acids derived from aromatic or cycloaliphatic hydrocarbons.

SUMMARY DEFINITION OF THE INVENTION

Accordingly, this invention concerns a fire-resistant synthetic resin composition, containing a polycarbonate, a non-reactive fireproofing additive derived from phosphonic acid, and possibly other additives and/or fillers, and characterized by the fact that the fireproofing agent has the general formula:

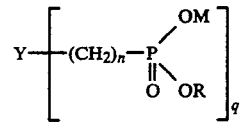

where
Y is a q-valent organic radical, derived, by the loss of q hydrogen atoms, from one of the group comprising cycloalkanes containing 6 to 8 carbon atoms, benzenic hydrocarbons containing 6 to 12 carbon atoms, di- or trinuclear aromatic hydrocarbons with enchained nuclei containing 12 to 20 carbon atoms, di- or trinuclear aromatic hydrocarbons with condensed nuclei containing 10 to 20 carbon atoms, aromatic compounds having the formula Ar-Z-Ar, in which Ar is a monovalent aryl radical containing 6 to 12 carbon atoms, and Z represents —S—, —O—, —SO$_2$—, —SO—, —CO—, and brominated or chlorinated derivatives of such aromatic hydrocarbons and compounds;
q is a number equal to 1, 2, 3;
n is a number equal to 0, 1, 2;
R is an alkyl radical containing 1 to 6 carbon atoms, a phenyl radical or a cyclohexyl radical;
M is an atom of an alkaline metal belonging to the group comprising Li, Na and K, preferably K,
the concentration of additive in relation with polycarbonate being 0.01 to 0.4 weight%.

Specially recommended additives of this kind are those defined by the following formulae:

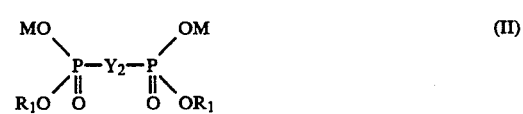

-continued

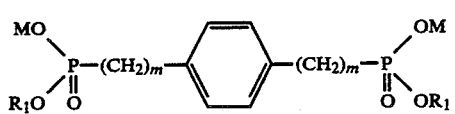
(III)

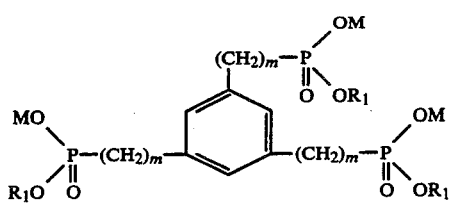
(IV)

where:
Y₁ is a monovalent radical derived, by the loss of a nuclear hydrogen atom, from a compound belonging to the group comprising benzene, toluene, ethylbenzene, bromobenzene, cyclohexane and diphenylether;
Y₂ is a divalent radical derived, by the loss of two hydrogen atoms, each located on a different nucleus, from a compound belonging to the group comprising diphenyl, diphenyloxide, diphenylsulphone, diphenyl-2.2 propane, and naphthalene;
n is a number equal to 0, 1, 2;
m is a number equal to 0 or 1;
M is an atom of Li, K or Na, preferably K;
R₁ is a methyl or ethyl radical.

Recommended additives of this type comprise ethyl and potassium pnenylphosphonate, ethyl and potassium benzylphosphonate, and methyl and potassium benzylphosphonate, ethyl and potassium bromo-4-benzylphosphonate, diethyl and dipotassium paraxylylene diphosphonate, dimethyl and dipotassium paraxylylene diphosphonate, diethyl and dipotassium paraphenylene diphosphonate, ethyl and potassium cyclohexylmethylphosphonate, and diethyl and potassium diphenylene-4.4′diphosphonate.

The alkaline hemiesters of phosphonic acids used as fireproofing additives are obtained by alkaline hydrolysis of the corresponding diesters.

Phosphonic diesters may be obtained by an Arbuzov reaction between a halide with the formula $$Y-(CH_2)_n\ X]_q$$

and a trihydrocarbyl phosphite with the formula

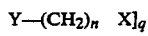

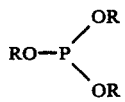

where X is a halogen such as chlorine or bromine, and R, Y, n and q have the meanings already stated above, in accordance with the following reaction scheme:

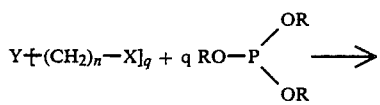

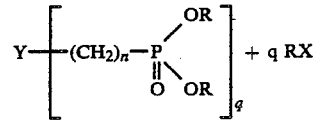

More specifically, diesters corresponding to hemiesters with formulae I to IV can be obtained by the following reactions:

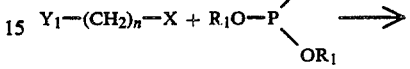

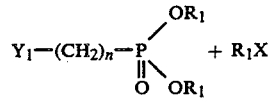

(II) 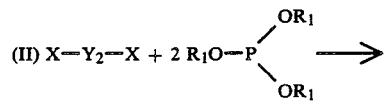

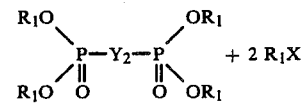

(III) 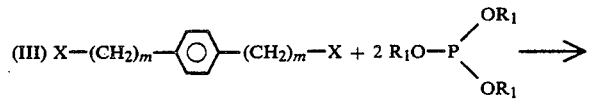

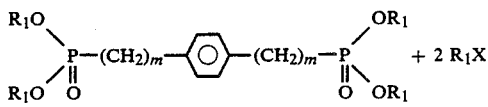

(IV)

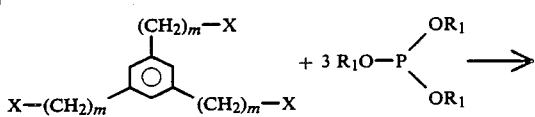

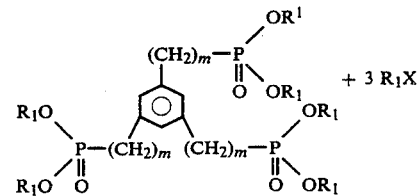

where Y₁, Y₂, X, R₁, n and m have the meanings already stated.

The Arbuzov reaction to produce diesters is usually performed by reflux heating of a mixture of halide and phosphite, possibly in an inert solvent, for example an aromatic hydrocarbon such as benzene, toluene, or xylene, and in the presence if necessary of a catalyst such as NiCl₂. When the reagents have been in contact for a sufficiently long time, the reaction mixture is distilled, to remove volatile compounds and obtain the diester as a distillation residue. This isolated raw diester is then purified by some suitable method.

Alkaline hydrolysis to produce phosphonic hemiesters from such diesters is preferably carried out by the following procedure:

the phosphonic diester is treated for 1 to 10 hours at reflux, with an aqueous solution of a hydroxide with the formula MOH, in which M is Li, Na or K, containing 5 to 15% weight of hydroxide, the molar ratio of MOH to diester being 1.2 to 1.5;

the reaction mixture is then cooled, after which excess hydroxide is neutralized with concentrated HCl to obtain a pH-value of 7;

the neutralized mixture is dry concentrated, and the residue is mixed with methanol;

the MCl precipitate is eliminated by filtration, the methanolic filtrate is dry concentrated, and the residue is once again mixed with methanol if necessary, followed by filtration and dry concentration.

Polycarbonates fireproofed by the addition of very small amounts of these alkaline hemiesters may be selected from the various aromatic polycarbonates or copolycarbonates derived from one or more diphenols, such as resorcinol, hydroquinone, dihydroxydiphenyl, bis(hydroxyphenyl) alkanes, bis(hydroxyphenyl) cycloalkanes, bis(hydroxyphenyl) ethers, bis(hydroxyphenyl) sulphides, bis(hydroxyphenyl) cetones, bis(hydroxyphenyl) sulphones, bis(hydroxyphenyl) sulphoxides, $\alpha.\alpha'$-bis(hydroxyphenyl) di-isopropylbenzenes, and derivatives of such diphenols alkylated on the nucleus.

More specifically, such polycarbonates or copolycarbonates may be selected from derivatives of one or more bisphenols such as, among others:

bis (hydroxy-4 phenyl)-2.2 propane,
dihydroxy-4.4'diphenyl,
bis(hydroxy-4 phenyl)-2.4 methyl-2-butane,
bis(hydroxy-4 phenyl)-1.1 cyclohexane,
$\alpha.\alpha'$-bis (hydroxy-4 phenyl) p-di-isopropylbenzene,
bis(methyl-3 hydroxy-4 phenyl)-2.2 propane,
bis(dimethyl-3.5 hydroxy-4 phenyl)-2.2 propane,
bis(dimethyl-3.5 hydroxy-4 phenyl) methane,
bis(dimethyl-3.5 hydroxy-4 phenyl)-2.2 propane,
bis(dimethyl-3.5 hydroxy-4 phenyl) sulphone,
bis(dimethyl-3.5 hydroxy-4 phenyl)-2.4 methyl-2 butane,
bis(dimethyl-3.5 hydroxy-4 phenyl)-1.1 cyclohexane, and
$\alpha.\alpha'$-bis(dimethyl-3.5 hydroxy-4 phenyl) p-di-isopropylbenzene.

Recommended polycarbonates and copolycarbonates are derivates of one or more bisphenols selected from the group comprising bis(hydroxy-4 phenyl)-2.2 propane, also known as bisphenol A, bis(dimethyl-3.5 hydroxy-4 phenyl)-2.2 propane, and bis(hydroxy-4 phenyl)-1.1 cyclohexane.

These aromatic polycarbonates, which can be obtained by known processes of transesterification in a molten medium between the selected diphenol or diphenols and the diphenyl carbonate, or interfacial reaction between the selected diphenol or diphenols and phosgene, are usually thermoplastic, with viscosimetric molecular weights, calculated on the basis of their viscosity in solution, of between 15,000 and 60,000, and preferably between 20,000 and 40,000.

As already stated, the concentration of fireproofing agent added to the polycarbonate is between 0.01 and 0.4, and preferably between 0.01 and 0.15 weight%.

In addition to the fireproofing additive, polycarbonate compositions may also contain other additives, such as pigments, colouring agents, UV stabilizing agents, demoulding agents, heat stabilizing agents and fillers. Such compositions may also contain glass fibre, more specifically in amounts ranging from 10 to 35% of the weight of polycarbonate, in order to make the polycarbonate thermoplastic resin more rigid. Agents may also be added to reduce dripping, such as polysiloxanes or polytetrafluoroethylenes, more specifically polytetrafluoroethylenes used in the form of a white powder, obtained by polymerizing tetrafluoroethylene in an aqueous emulsion, and possessing molecular weights of between $10^5$ and $10^6$. The quantity of polytetrafluoroethylene added may be 0.1 to 1% of the weight of polycarbonate.

Such compositions can be prepared by using various existing techniques for mixing the various ingredients, for example by mixing together the polycarbonate in granular form with the fireproofing additive and any other additives dry in a drum, then extruding the mixture at a temperature of 260° to 290° C., and making pellets from the extrudate.

The fire-resistant properties of these polycarbonate compositions have been assessed on test samples produced by injection moulding, at temperatures of 280° to 320° C., using mixtures of polycarbonate and fireproofing additive, obtained by dry mixing in a drum, followed by extrusion and pelletization of the extrudate.

Various tests are available to evaluate the fire-resistant properties of polymers. Two combustion tests, regarded as particularly significant, were selected to assess the fire-resistant properties of such compositions: the oxygen index measurement test described in standard ASTM D 2863, and combustion test UL-94, as described in Bulletin 94 of Underwriter's Laboratories; both these procedures are summarized below.

OXYGEN INDEX TEST

This test is used to measure the minimum oxygen concentration, in percentage volume, also known as the limit oxygen index (LOI), contained in a mixed flow of oxygen and nitrogen, just sufficient to maintain combustion of the test sample in the same way that a candle burns.

The limit oxygen index is defined by the formula:

$$LOI = \frac{|O_2|}{|O_2| + |N_2|} \times 100$$

where $|O_2|$ and $|N_2|$ are the volumetric flow rates, in cc/sec., of oxygen and nitrogen combined to form the combustion mixture, in equilibrium (candle combustion) conditions.

UL-94 TEST

For this test, parallelepiped-shaped test samples, 120 mm long, 12.7 mm wide and 3.2 mm thick, are attached vertically, and exposed twice, for 10 seconds each time, to the blue flame of a gas burner 19 mm high, the top of the burner being positioned approximately 10 mm below the sample.

The samples are placed 30.5 cm above a horizontal layer of surgical cottonwool.

Five samples are examined, and the material is rated in one of the following three categories:

Rating "94 V2":

No sample continues to burn with a flame for more than 30 seconds after each application of the burner flame.

The total duration of combustion with a flame does not exceed 250 seconds for the 10 applications of flame to each series of 5 samples.

The material may drip on to the cottonwool and ignite it.

Rating "94 V1":

Combustion times are the same as for classification 94 V2, but the material does not drip on to the cottonwool and ignite it.

Rating "94 V0":

No sample burns with a flame for more than 10 seconds after each application of the burner flame.

The total duration of combustion with a flame does not exceed 50 seconds for the 10 applications of flame.

The material must not drip on to the cottonwool and ignite it.

DETAILED DESCRIPTION OF PREFERRED EXAMPLES

The invention is illustrated by, without being confined to, the following examples.

EXAMPLE 1

Preparation of alkaline hemiesters of hydrocarbylphosphonic acids as fireproofing additives The alkaline hemiesters were obtained by alkaline hydrolysis of the appropriate diesters, using the following procedure.

A mixture of the selected phosphonic diester and a 10% KOH aqueous solution, in a molar ratio of KOH to diester of 1.3, was heated at reflux temperature for 6 hours, then said mixture was cooled to atmospheric temperature. Excess KOH was then neutralized by addition of concentrated HCl to a pH-value of 7. The neutralized phase was then dry concentrated, and the residue mixed with methanol. The resulting suspension

TABLE I

| DIESTER | HEMIESTER | Efficiency % |
|---|---|---|
| Diethyl benzylphosphonate | Ethyl and potassium benzylphosphonate | 92.7 |
| Diethyl bromo-4 benzylphosphonate | Ethyl and potassiuym bromo-4 benzylphosphonate | 78 |
| Diethyl phenylphosphonate | Ethyl and potassium phenylphosphonate | 82 |
| Tetraethyl paraxylylene diphosphonate | Diethyl and dipotassium paraxylylene diphosphonate | 87.8 87.8 |
| Tetramethyl paraxylylene diphosphonate | Dimethyl and dipotassium paraxylylene diphosphonate | 65 |
| Tetraethyl diphenylene-4.4' diphosphonate | Diethyl and dipotassium Diphenylene-4,4' diphosphonate | 90.6 |
| Tetraethyl paraphenylene diphosphonate | Diethyl and dipotassium paraphenylene diphosphonate | 94.7 |

TABLE I-continued

| DIESTER | HEMIESTER | Efficiency % |
|---|---|---|
| (C₂H₅O)₂P(O)–C₆H₄–P(O)(OC₂H₅)₂ structure<br>Diethyl cyclohexyl methylphosphonate | (KO)(C₂H₅O)P(O)–C₆H₄–P(O)(OK)(OC₂H₅) structure<br>Ethyl and potassium cyclohexyl methylphosphonate | 93<br>93 |
| C₆H₁₁–CH₂–P(O)(OC₂H₅)₂ | C₆H₁₁–CH₂–P(O)(OK)(OC₂H₅) | | was filtered to remove precipitated KCl, and the methanolic filtrate was dry concentrated. The residue was again mixed with methanol, the solution filtered, and the filtrate dry concentrated.

The product resulting from this final dry concentration was dried in a vacuum at 100° to 120° C. for 24 hours.

The gross formula of each such potassium hemiester was defined by elementary analysis, and the expanded formula was obtained from the results of infrared and proton NMR analyses (using $D_2O$ as solvent).

Table I below shows the original diester for each test, together with its expanded formula, the hemiester obtained, together with its expanded formula, and the efficiency of hydrolysis in each case, expressed as a molar percentage of hemiester.

EXAMPLES 2 TO 4

Fire resistant properties of polycarbonate compositions containing the fireproofing additives in example 1

The LOI test and UL-94 combustion test were carried out, using test samples obtained in the way described above, from mixtures of polycarbonate and variable concentrations of one of the potassium hemiesters, as specified in example 1.

Three different commercial polycarbonates, produced by interfacial reaction between phosgene and bisphenol A, were used, with the following viscosimetric molecular weights: 25,000 (example 2), 22,000 (example 3), and 27,000 (example 4).

Table II shows the results of these tests.

The amount of hemiester additive in the composition is given in weight% in relation to polycarbonate.

For the UL-94 test, the average combustion time corresponds to the total duration of combustion with a flame, divided by 10, the number of applications of the burner flame.

The results above show that these fireproofing additives bring about a considerable improvement in the fire-resistant properties of polycarbonate. With very small amounts of additive, namely 0.01 to 0.1%, a significant rise in the LOI was observed. In test UL-94, very short average combustion times were also observed, in most cases less than 5 seconds, whereas the reference samples burned for 14 to 21 seconds, even entirely. There was also a marked decrease in dripping: in some cases (examples 2b, 2c and 3c), a number of test samples did not drip at all, and had average combustion times of less than 5 seconds. For this reason, they were classified as "V0".

These examples show that these new compositions represent a major technological advance, in improving the fire resistance of polycarbonate, through the use of very small amounts of additives, thereby ensuring that the original mechanical properties and transparency of the treated polycarbonate remain unaffected.

EXAMPLE 5

Using the procedure described above, a polycarbonate composition was prepared, from the polycarbonate used in example 2, containing 0.05 weight% of diethyl and dipotassium paraphenylene diphosphonate in relation to polycarbonate, as fireproofing additive, and 0.5% weight of a commercial polytetrafluoroethylene, obtained by polymerizing tetrafluoroethylene in an aqueous emulsion, and possessing a molecular weight of approximately 600,000.

TABLE II

| EXAMPLE | SERIES | POTASSIUM HEMIESTER Description | Concentration (%) | LOI | UL-94 TEST Average combustion time (secs) | Rating | Remarks |
|---|---|---|---|---|---|---|---|
| 2 | a | None (for reference) | | 25 | 21 | V2 | Extensive dripping |
| | b | Ethyl and potassium benzylphosphonate | 0.1 | 35 | 2 | V2 | 2 samples V0 |
| | | | 0.05 | 33.6 | 1.9 | V2 | |
| | | | 0.01 | 32 | 4 | V2 | |
| | c | Ethyl and potassium phenylphosphonate | 0.1 | 34 | 1.44 | V2 | 1 sample V0 |
| | | | 0.05 | 34 | 1.4 | V2 | 4 samples V0 |
| | | | 0.01 | 31 | 1.3 | V2 | 1 sample V0 |
| | d | Diethyl and dipotassium paraxylylene diphosphonate | 0.1 | 31.6 | 3.3 | V2 | 2 drips per sample |
| | | | 0.02 | 32 | 2.9 | V2 | 1 drip per sample |
| | | | 0.01 | 30 | 4.2 | V2 | |
| | e | Dimethyl and dipotassium paraxylylene diphosphonate | 0.02 | 31.6 | 3.5 | V2 | |
| | f | Diethyl and dipotassium Diphenylene-4.4'diphosphonate | 0.02 | 31.4 | 2.7 | V2 | |
| | g | Diethyl and dipotassium paraphenylene diphosphonate | 0.02 | 30 | 3.8 | V2 | 1 drip per sample |
| | | | 0.05 | 31.3 | 5.4 | V2 | |

TABLE II-continued

| EXAMPLE | SERIES | POTASSIUM HEMIESTER Description | Concentration (%) | LOI | UL-94 TEST Average combustion time (secs) | Rating | Remarks |
|---|---|---|---|---|---|---|---|
| 3 | a | None (for reference) | 0.03 | 31.8<br>25 | 3.8<br>14 | V2<br>V2 | Extensive dripping |
|  | b | Ethyl and potassium bromo-4 benzylphosphonate | 0.02 | 30.4 | 4.3 | V2 |  |
|  | c | Ethyl and potassium cyclohexyl methylphosphonate | 0.1 | 39.8 | 1.6 | V2 | 2 samples V0 |
| 4 | a | None (for reference) |  | 24.4 |  | Burns |  |
|  | b | Diethyl and dipotassium paraphenylene diphosphonate | 0.03 | 32 | 6.7 | V2 | 3 samples V1 |

This composition was used to make test samples for the LOI test and UL-94 combustion test.

The limit oxygen index was 30. The composition was classified "V0" in the UL-94 test, with an average combustion time of 2.7 seconds, the non-transparent samples not dripping onto the cottonwool.

EXAMPLE 6

Using the procedure described above, a polycarbonate composition was prepared, from the polycarbonate used in example 2, containing 30% weight of ground glass fibre and 0.05 weight% of diethyl and dipotassium. paraphenylene diphosphonate.

This composition was used to make test samples for the LOI test and for the epiradiator method of measuring fire resistance, as described in detail in standards NF P 92501 and NF P 92505, established by the Centre Scientifique et Technique du Batiment.

The limit oxygen index was 40.5, and the material was rated "M3" in the epiradiator test. Without the 0.05% fireproofing additive, on the other hand, the oxygen index was only 34.5, and the epiradiator rating was "M4" (lower fire resistance than in the presence of the fireproofing additive).

We claim:

1. A hemiester with the formula

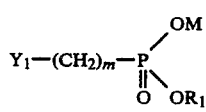

where $Y_1$ is a monovalent radical derived, by the loss of a nuclear hydrogen atom, from a compound selected from the group consisting of benzene, toluene, ethylbenzene, bromobenzene and cyclohexane, $R_1$ is a methyl or ethyl radical, m is 0 or 1 and M is potassium.

2. A hemiester with the formula

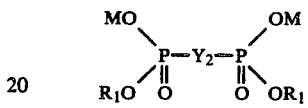

where $Y_2$ is a divalent radical derived, by the loss of two hydrogen atoms, each located on a different nucleus, from a compound selected from the group consisting of diphenyl, diphenyloxide, diphenylsulphone and diphenyl-2,2-propane, $R_1$ is a methyl or ethyl radical and M is potassium.

3. A hemiester with the formula

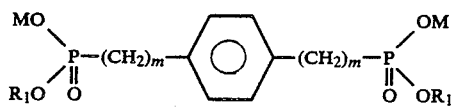

where m is a number equal to 0 or 1, and $R_1$ is a methyl or ethyl radical and M is potassium.

4. A hemiester with the formula

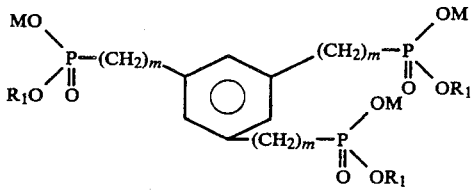

where m is a number equal to 0 or 1, and $R_1$ is a methyl or ethyl radical and M is potassium.

5. A hemiester according to claim 1, selected from the group consisting of ethyl and potassium phenylphosphonate, ethyl and potassium benzylphosphonate, methyl and potassium benzylphosphonates, ethyl and potassium bromo-4 benzylphosphonate and ethyl and potassium cyclohexyl methylphosphonate.

6. A hemiester according to claim 2, which is a diethyl and dipotassium diphenylene-4,4' diphosphonate.

7. A hemiester according to claim 3, selected from the group consisting of diethyl and dipotassium paraxylylene diphosphonate, dimethyl and dipotassium paraxylylene diphosphonate, diethyl and dipotassium paraphenylene diphosphonate.

* * * * *